Nov. 19, 1963   L. C. BOGAERTS   3,110,990
BRAKE LINING GROOVER
Filed June 27, 1961   3 Sheets-Sheet 1
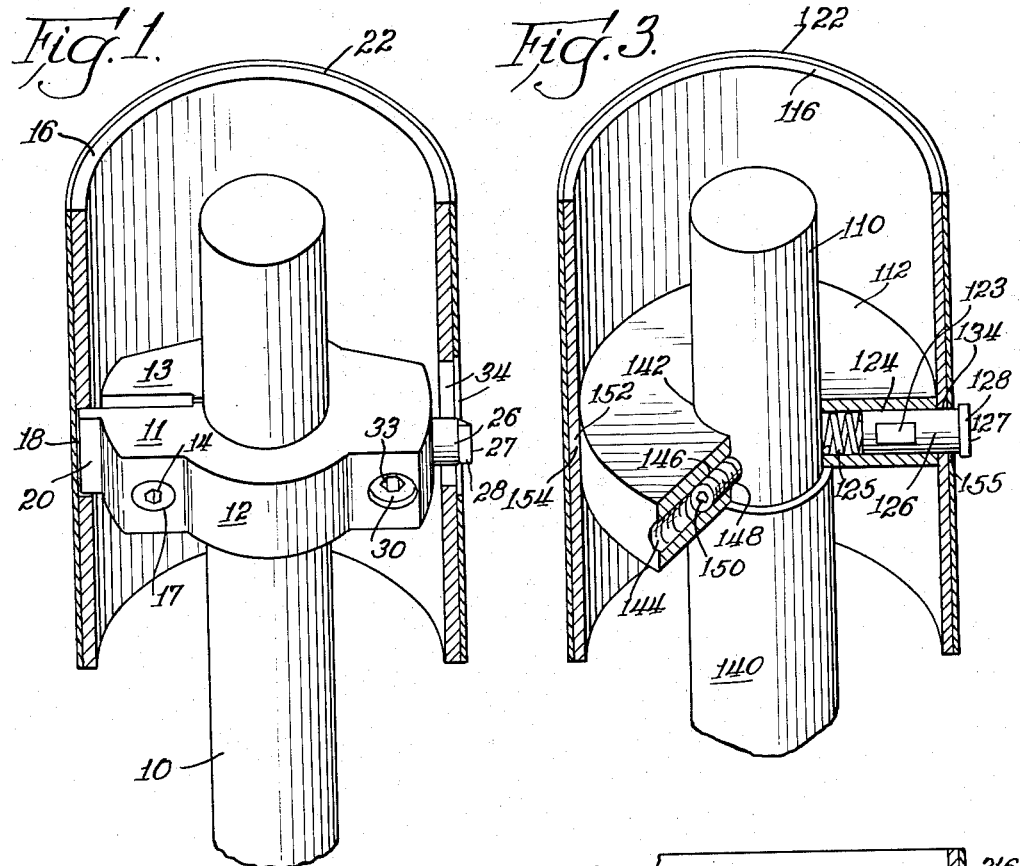
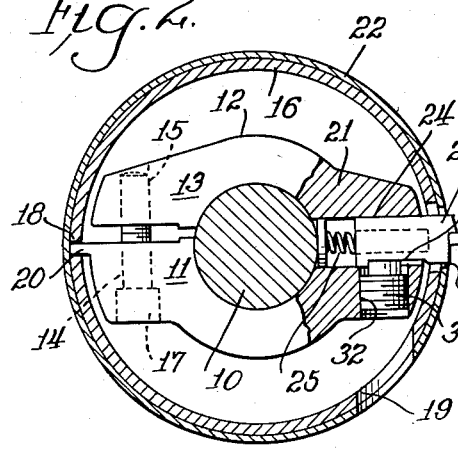
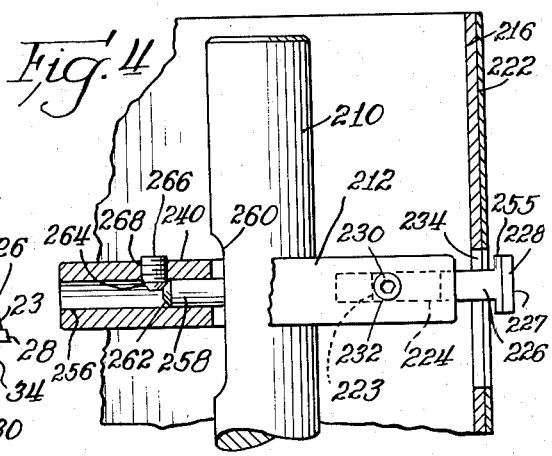
INVENTOR.
Leo C. Bogaerts
By Fidler, Beardsley & Bradley
Attys.

Nov. 19, 1963 L. C. BOGAERTS 3,110,990
BRAKE LINING GROOVER
Filed June 27, 1961 3 Sheets-Sheet 2

INVENTOR.
Leo C. Bogaerts

By Fidler, Bradley & Bradley
Att'ys.

Nov. 19, 1963  L. C. BOGAERTS  3,110,990
BRAKE LINING GROOVER

Filed June 27, 1961  3 Sheets-Sheet 3

INVENTOR.
Leo C. Bogaerts
BY
Fidler, Beardsley & Bradley
Attys

United States Patent Office 3,110,990
Patented Nov. 19, 1963

3,110,990
BRAKE LINING GROOVER
Leo C. Bogaerts, Antioch, Ill., assignor to Ammco Tools, Inc., Chicago, Ill., a corporation of Illinois
Filed June 27, 1961, Ser. No. 121,810
14 Claims. (Cl. 51—181)

This invention relates to brake lining groovers and in particular to such groovers which are adapted to simultaneously grind and groove the brake lining of a brake shoe which is adapted to cooperate with a brake drum of a motor vehicle.

It has been found that the brakes of a motor vehicle become more efficient if a groove is cut into the lining borne by the brake shoes. This groove has the effect of decreasing the heating of the lining during operation of the brakes, and allows for faster cooling when the brakes are released. As a result, many modern automobiles are equipped with brake linings having such a groove, although, since the groove is a fairly recent development, older models of automobiles remain equipped with brake linings having a continuous, ungrooved surface. When the brake lining wears thin after repeated use over a period of time, it must be replaced with new lining material. This new material must be ground down on the brake shoe so that it matches the contour of the drum with which the shoe cooperates. Additionally, if the brake shoe is designed to have a lining with a groove cut into it, that groove must be cut after the lining is positioned on the shoe.

It has been an object of prior art devices to provide mechanisms which can grind down the lining in the brake shoe, and, in the same operation, cut a groove into the lining. However, these previous lining groovers have not been wholly satisfactory, in that the tool bit adapted for grooving the lining has been contained within a split sleeve, or, between two abrasive-covered drums which serve to perform the grinding function. These devices each have a discontinuity extending peripherally around the lining groover to accommodate the tool bit, and no grinding occurs in this area. This opening for the tool bit thus does not provide for an overlapping of the grooving and grinding functions of these devices. As a result, a small ridge is formed at the edge included between the grooved and ground surface. It has been necessary to remove this ridge by a further grinding operation subsequent to grooving. This requires additional time and materials to complete the installation of the new brake lining.

Therefore, it is an object of the present invention to provide a lining groover in which no discontinuity in the grinding action occurs during the grooving operation.

It is a further object of the present invention to provide a lining groover adapted to groove a brake lining without forming a ridge included between the grooved and ground surfaces.

It is another object of the present invention to provide a lining groover in which the tool bit for the grooving operation is readily adjustable and replaceable.

It is a further object of the present invention to provide a lining groover which is capable of being easily and inexpensively manufactured.

It is another object of the present invention to provide a lining grinder and groover which may be employed to finish the surface of both grooved and grooveless brake shoe linings in a single operation.

According to the present invention there is provided a spindle upon which is mounted a spacer adapted for rotation with the spindle, a cylindrical arbor borne by the spacer, and an abrasive sleeve supported on the arbor. The abrasive sleeve is adapted to rotate with the spindle about the axis thereof, and thereby to grind the surface of a brake lining when brought into contact therewith. The arbor and the abrasive sleeve are provided with an aperture therein, through which a tool bit may extend, the tool bit being rigidly supported by the spacer. The tool bit is adjustable radially with respect to the spindle, and is of such a width, and its amount of projection radially beyond the sleeve is such, as to cut the required width and depth of groove in the brake lining while the grinding operation is being performed by the abrasive sleeve.

The objects and advantages of the present invention will be more fully understood by reference to the following description and the accompanying drawings in which:

FIG. 1 is a perspective view, partly in section, of a lining groover constructed in accordance with the invention;

FIG. 2 is a top view, partly in section, of the lining groover illustrated in FIG. 1;

FIG. 3 is a perspective view, partly in section, of a second form of lining groover embodying the invention;

FIG. 4 is a side view, partly in section, of a third form of lining groover embodying the invention.

Figure 5:
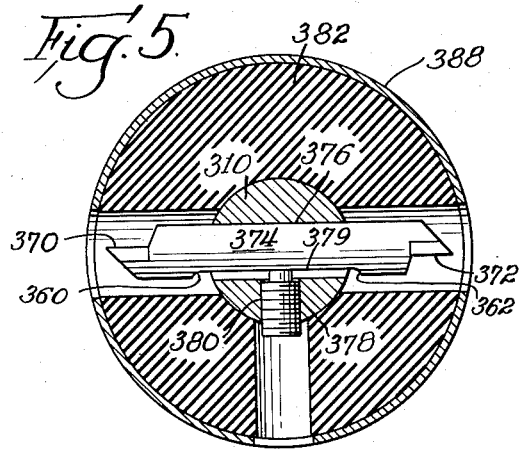
FIG. 5 is a top view of a fourth form of lining groover embodying the invention.

Referring now to the drawings, there is shown in FIGS. 1 and 2 a lining groover having a spindle 10 adapted to be rotated by a source of power (not shown). Rigidly supported on the spindle 10 is a tool holder 12. The tool holder 12 is generally in the shape of a U having arms 11 and 13. Arms 11 and 13 are together provided with a bore 15 adapted to receive a bolt 14. The portion of the bore through the arm 13 is provided with threads matching the threads of the bolt 14, and bolt 14 is passed through the arm 11 and threaded into the arm 13. The U-shaped tool holder 12 is adapted to be clamped tightly to the spindle by the tightening of bolt 14, which draws the arms 11 and 13 together and exerts a clamping force on the spindle 10. The bolt 14 is provided with a head 17, having a hexagonal socket adapted to receive a suitable tool, by which the bolt 14 may be rotated when it is being tightened.

The tool holder 12 is adapted to position a cylindrical arbor 16 which is provided with a slot 18 adapted to receive a tab 20 located on the arm 11 of the U-shaped tool holder 12. The engagement of the tab 20 in the slot 18 firmly holds the arbor 16 in a fixed angular position with respect to the tool holder 12 and spindle 10, for rotation with the spindle 10, and aligns the tool holder 12 with apertures in the arbor 16, which apertures are discussed hereinafter. An abrasive sleeve 22 overlies the exterior of arbor 16, and is firmly supported by arbor 16 by being closely fitted thereon. The abrasive sleeve 22 is adapted to perform a grinding operation on the brake lining to be finished.

At the other end of the tool holder 12 there is provided a third arm 21 having a bore 24 within which is set a tool bit shank 26, holding a tool bit 28. The tool bit shank 26 is adapted for sliding movement within the bore 24 and is adapted to be retained in position by a dog point set screw 30 extending through the bore 32 in the tool holder 12. The bore 32 is disposed at a right angle with the bore 24 so that the set screw 30 may be drawn up tightly against the tool bit shank 26 wedging it firmly into position within the bore 24, and fixedly determining the position of the tool bit shank 26 longitudinally within the bore 24. The tool bit 28 is preferably of a good quality of cutting steel or carbide, brazed to the tool bit shank 26. It will be appreciated that the tool bit 28 and tool bit shank 26 may be replaced when necessary after a tool bit 28 has worn-out.

The set screw 30 is provided with a hexagonal socket 33 whereby it may be tightened with a suitable tool (not shown), extending through an aperture 19 in the arbor 16 and the abrasive sleeve 22, into setting engagement with the tool bit shank 26, after tool bit shank 26 has been correctly positioned within bore 24. A spring 25 is disposed within bore 24 and urges tool bit shank 26 radially outward. The spring facilitates adjustment and removal of the tool bit shank 26 from bore 24. Both the arbor 16 and the abrasive sleeve 22 are provided with another aperture 34, through which the tool bit shank 26 and tool bit 28 may project beyond the outer surface of abrasive sleeve 22, so that the cutting edge 27 of the tool bit 28 is at a predetermined radial distance, with respect to the spindle, beyond the outer surface of the abrasive sleeve 22. The tool bit 28 is set at this predetermined distance automatically, since the spring 25 seats the rear surface of a recess 23 against set screw 30.

In operation, a brake shoe (not shown) is positioned in a clamp (not shown), and the brake shoe groover of the invention is brought into engagement with the lining on the brake shoe, and then rotated about the shoe while the spindle 10 is turning. The means for bringing the groover into engagement with the brake shoe, and rotating it, may be any of a number of traversing devices well known to the prior art, and does not constitute a part of the present invention. The tool bit 28 will cut a groove in the brake shoe lining at the required position. The groove will be cut to a predetermined depth dependent upon the position of the edge 27 of the tool bit 28, with respect to the surface of the abrasive sleeve 22. After a groove has been cut to this depth, the abrasive sleeve 22 will begin to grind the brake lining to form its surface to the correct degree of convexity, so as to cooperate with its associated brake drum. This curvature results when the brake shoe is pivoted about a point distant from the lining to be ground by an amount which is equal to the radius of the brake drum, so that after completion of the grinding operation, the surface of the brake lining on the brake shoe will exactly correspond to that of its associated brake drum. All the time the abrasive sleeve 22 is shaping the lining, the cutting edge 27 of the tool bit 28 continues its grooving function, always cutting a groove at exactly the same depth, as determined by the amount of penetration of edge 27 beyond the outside surface of abrasive sleeve 22. When the lining has been properly shaped, the operation of the brake lining groover is discontinued and the brake shoe is then ready for assembly in the brake mechanism of a motor vehicle. It will be appreciated that as long as grinding continues by action of the abrasive sleeve 22, the groove in the brake lining will be cut, always to the desired predetermined depth, until the operation is completed.

The apertures 19 and 34, in the arbor 16 and the abrasive sleeve 22, in FIGS. 1 and 2, is made long enough in a direction parallel to the axis of spindle 10, so that tool holder 12 may be located at various positions along the length of spindle 10 without affecting the adjustment of tool bit 28. The position of tool holder 12 is thus shifted when the groove is desired to be cut in different places in the brake shoe, relative to the surface of the abrasive sleeve 22. Except for the apertures 19 and 34, the abrasive sleeve 22 is continuous throughout all of its cylindrical surface and, therefore, the surface of the brake lining being shaped is continuously ground to the very edge of the groove cut by tool bit 28. There is, therefore, no ridge formed between the groove and the remaining portion of the brake lining which is being ground.

When it is desired to use the device for grinding the brake shoe lining of older model vehicles not having lining grooves, the tool bit 26 is pushed into the tool holder 12 and locked in position with set screw 30.

In FIG. 3 there is illustrated an alternative lining groover having an arbor 116 and an abrasive sleeve 122 similar to those of FIGS. 1 and 2. The tool holder 112, however, is in the form of a disk having a bore 142 adapted to slidably receive the upper part of a spindle 110 in close-fitting engagement. The lower part of spindle 110 has a widened portion 140, forming a lip upon which tool holder 112 rests. Another bore 144 is provided in the tool holder 112 and is equipped with threads 146 adapted to receive a cup point set screw 148 having a hexagonal opening 150 in one end thereof. The opening 150 is adapted to receive a tool for tightening the set screw 148. The set screw 148, upon being tightened, secures the tool holder 112 tightly in engagement with the spindle 110 and permits rotation of these elements together as one unitary assembly.

The tool bit 128 shown in FIG. 3 is held in tool bit shank 126 slidable in a bore 124 in tool holder 112, just as in the embodiments of FIGS. 1 and 2. Likewise, tool bit shank 126 and tool bit 128 extend through an aperture 134 in the arbor 116 and in the abrasive sleeve 122. The aperture 134 is made slightly larger than the width of the tool bit 128, so that the tool bit may be pushed into the tool holder 112 when not in use.

Tool bit shank 126 is provided with a recess 123 against which is seated a dog point set screw (not shown) just as in the device of FIGS. 1 and 2. An aperture (not shown) in arbor 116 permits adjustment of this set screw. The abrasive sleeve 122 is continuous except for the apertures mentioned, and therefore no ridge may be formed at the edge of the groove which is cut into the lining by the edge 127 of tool bit 128.

The tool of FIG. 3 differs from that of FIGS. 1 and 2 in that the former is not shiftable relative to the spindle 110.

In FIG. 4, alternative set screw arrangements are shown for connecting the tool holder 212 to the spindle 210, and for holding the tool holder 212 in position. A bore 256 is provided in tool holder 212 which bore is perpendicular to the axis of rotation of the spindle 210, and a locking dog 258 is slidably disposed within the bore 256. The spindle 210 is provided with a flattened portion 260 which receives locking dog 258, positively locking the spacer 212 to the spindle 210, thus fixing the relative angular position of the tool holder 212 with respect to the spindle 210. The locking dog 258 is provided with a conical end surface 262 which cooperates with a similar conical surface 264 on a set screw 266, disposed within a bore 268 in the tool holder 212. The bore 268 is perpendicular to the bore 256 and intersects it at a point corresponding to the end of locking dog 258.

When the set screw 266 is tightened, the conical surface 264 of the set screw 266 cooperates with the similar conical surface 262 of the locking dog 258 and forces the locking dog 258 longitudinally through the bore 256 into engagement with the flattened portion 260 of the spindle 210.

The tool holder 212 is provided with another bore 224 in which is inserted a tool bit shank 226 bearing a tool bit 228. A bore 232 is drilled into spacer 212 and intersects bore 224 at a right angle thereto. Bore 232 receives a set screw 230 having a dog point which holds tool bit shank 226 firmly in position in bore 224. Set screw 230 is held in bore 232 by corresponding threads in the bore and on the screw. Tool bit shank 226 is provided with a laterally extending surface 223 which is located at such a position on the tool bit shank 226 so as to properly locate the edge 227 of tool bit 228 when in a position adjacent set screw 230. This surface facilitates adjustment of the depth of the groove to be cut in the brake lining. When grooving is not desired, the tool bit shank 226 is retracted into bore 224.

The flattened portion 260 of the spindle 210 extends longitudinally along the spindle 210 to permit longitudinal adjustment of the tool holder 212 and the tool bit shank 226. Such adjustment is made when the position of the groove with respect to the abrasive sleeve 222 is desired to be varied. It will be appreciated that this may be done without removing the arbor 216, since set screw 266, like set screw 230, may be reached from inside the arbor.

In FIG. 5 there is shown an alternative lining groover in which two tool bits 370 and 372 are carried by a single tool bit holder 374 positioned in a bore 376 extending transversely through the spindle 310. The tool bit holder 374 is held in position in the bore 376 by a dog pointed set screw 378 received by a bore 380 in spindle 310, and secured therein by corresponding threads in bore 380 and on screw 378. The set screw 378 cooperates with a flattened portion 379 on the tool bit holder 374 and thus prevents the holder 374 from rotating in the bore 376.

Figure 6:
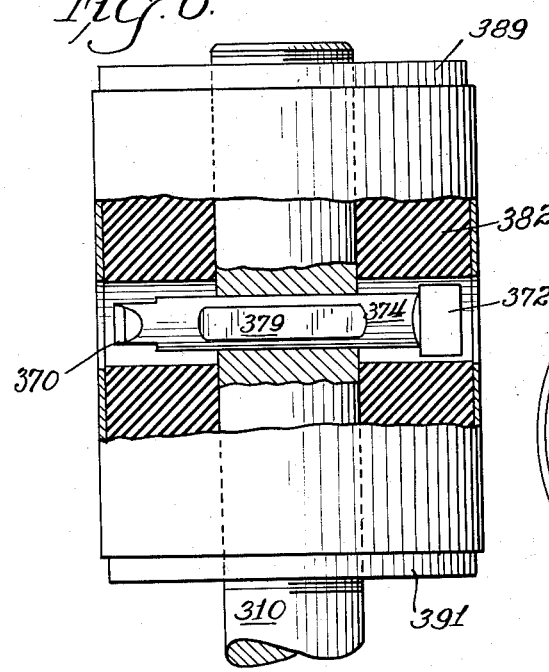
FIG. 6 is a side view, partly in section, of the lining groover of FIG. 5.

Surrounding the spindle 310 and fixed thereto for rotation therewith is a rubber arbor 382. An abrasive sleeve 388 fits over the rubber arbor 382, whereupon the arbor is compressed in its axial direction by rotating plates 389 and 391 which are threadably mounted on shaft 310. Upon such compression, the rubber tends to maintain a constant volume and therefore pushes outwardly on the abrasive sleeve 388, and prevents it from slipping. The abrasive sleeve 388 is thereby held in an angularly fixed position on arbor 382 by the friction between the surface of the rubber arbor 382 and the abrasive sleeve. FIGS. 5 and 6 illustrate the device when arbor 382 is in its uncompressed condition, before an abrasive sleeve 388 is assembled on the arbor.

It will be appreciated that the utilization of a rubber arbor 382 for retaining the abrasive sleeve 388 in position permits the equalization of tension in all locations of the abrasive sleeve and promotes its longer wear.

Each of the tool bits 370 and 372 is a different width, and thus the apparatus illustrated in FIGS. 5 and 6 may cut either of these two widths of grooves, as required. The flattened portion 379 of the tool bit holder 374 terminates in two transversely extending surfaces 360 and 362. Surface 360 is positioned on the tool bit holder 374 so that tool bit 372 is at the proper operating position when surface 360 is immediately adjacent set screw 378. Similarly, surface 362 determines the correct position of tool bit 370. When the set screw 378 is located in approximately the middle of flattened portion 379, as illustrated, both tool bits 370 and 372 are withdrawn and the device may be used to grind brake shoe lining without grooves.

Figure 7:
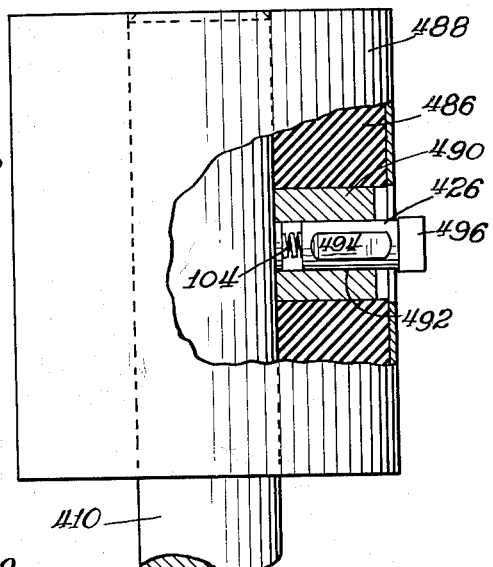
FIG. 7 is a side view, partly in section, of a fifth form of lining groover embodying the invention.
Figure 8:
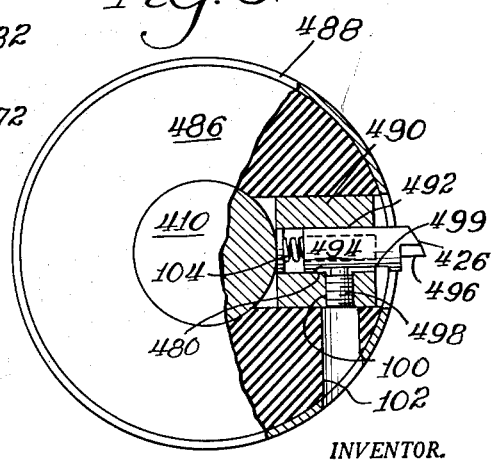
FIG. 8 is a top view, partly in section, of the lining groover shown in FIG. 7.

The embodiment of FIGS. 7 and 8 employs a rubber arbor 486 upon which is positioned an abrasive sleeve 488, which is held thereon by friction arising from compression of the rubber arbor 486 by which the sleeve 488 is supported. The plates by which the arbor is compressed, however, are not shown in this figure. A steel sleeve 490, integral with the arbor 486, is cast into the rubber arbor during the manufacture of the arbor. The sleeve 490 is provided with a bore 492 within which tool bit holder 494 is slidably disposed and adapted to hold a tool bit 496 brazed thereon. The tool bit holder 494 is retained in position within the bore 492 by a set screw 498 threadably received within a bore 100. The set screw 498 cooperates with a flattened portion 499 on the tool bit holder 494, and thus prevents tool bit holder 494 from rotating within bore 492. The flattened portion 499 terminates in a transversely extending surface 480, which correctly positions the tool bit 496 when surface 480 is adjacent set screw 498.

The set screw 498 extends through the sleeve 490 and is provided with a hexagonal socket so that it may be tightened into position relative to said tool bit holder 494 by insertion and rotation of a suitable tool. The bore 100 opens into a larger bore 102 having an axis aligned with the bore 100. The bore 102 extends through the rubber arbor 486 to provide access to the set screw 498. The latter is provided with a dog point engaging the tool bit holder 494 at its flattened position 499.

Also located within the bore 492 of the sleeve 490 is a spring 104 adapted to urge the tool bit holder radially outward with respect to the spindle 410. The spring 104 serves to facilitate the positioning of the tool bit 496. Thus, in positioning the location of the edge of the tool bit 496 with respect to the surface of the abrasive sleeve 488 it is merely necessary to loosen set screw and allow spring 104 to urge the tool bit holder 494 outwardly until the set screw 498 contacts the surface 480 of the flattened portion 499.

If the shoe is to be ground without a groove, the set screw 498 is loosened and the tool bit holder is pushed inwardly in bore 492 and locked in place by set screw 498.

Figure 9:
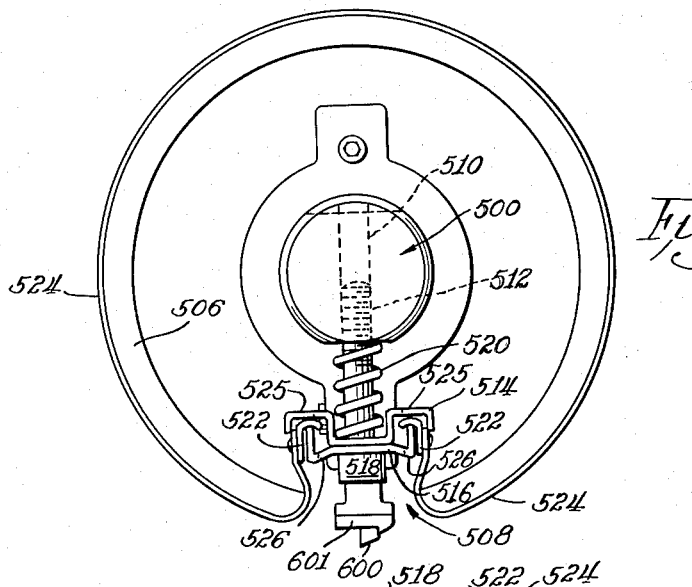
FIG. 9 is a top view of a sixth form of lining groover embodying the invention.
Figure 10:
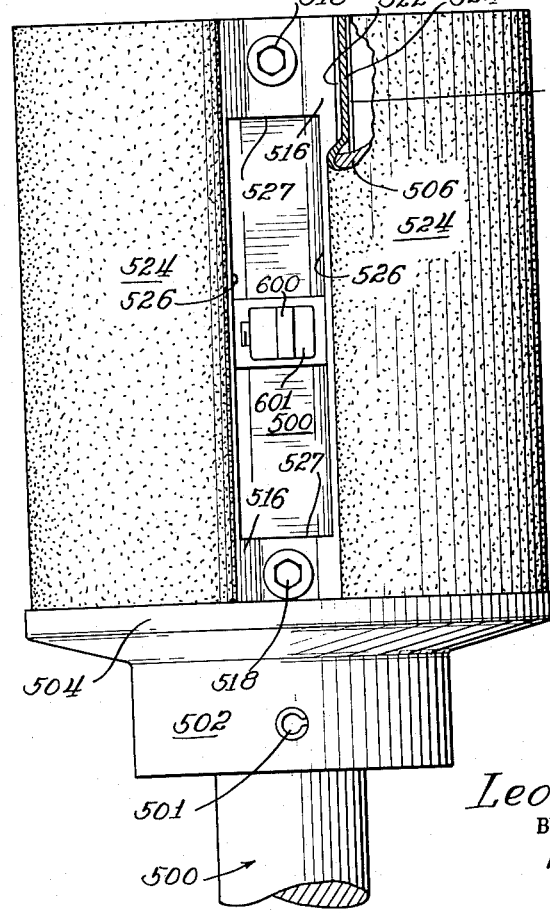
FIG. 10 is a side view, partly broken away and partly in section, of the lining groover shown in FIG. 9.

Referring now to FIGS. 9 and 10 of the drawings, a sixth form of lining groover embodying the invention comprises a spindle 500 fitted with a body member 502 nonrotatably secured to the spindle by a rollpin 501 extending through aligned bores in the spindle 500 and the body member 502. The body member 502 has a base portion 504 which terminates in a surface substantially perpendicular to the axis of the spindle, and a cylindrical arbor 506 extending longitudinally from the base portion 504. The arbor 506 is provided with a slot 508 extending parallel to the axis of the spindle, through which slot the cutting edge of a tool bit 600 may extend in the same manner in the other embodiments described above.

The spindle 500 extends through the base portion 504 of the body member 502, and is centrally located with respect to the arbor 506. The tool holder 601 is preferably secured to the spindle 500 in the manner disclosed in FIG. 4.

The spindle 500 is provided with a pair of bores 510, drilled radially therethrough, in which a pair of screws 512 are threadably mounted, one screw near the top and the other screw near the bottom of the arbor 506. The screws 512 pass through holes in a pair of clamping members 514 and 516, which holes are located near the top and bottom thereof, and the heads 518 of the screws 512 maintain the clamping members 514 and 516 in a position inward with respect to the arbor 506. A pair of springs 520, each mounted on a screw 512, urge the clamping members 514 and 516 against the screw heads 518, and against each other.

The clamping members 514 and 516 form a belt retainer. The two clamping members 514 and 516 are adapted to hold a pair of belt hooks 522 in positions on either side of the slot 508 in the arbor 506. The two belt hooks are attached to opposite ends of an abrasive belt 524.

Each of the clamping members 514 and 516 is provided with a rectangularly shaped aperture having vertical edges 526 and horizontal edges 527, radially aligned with the slot 508 in the arbor 506 and having a length which is a large proportion of the distance between the screws 512. This aperture permits a tool (not shown) to extend beyond the surface of the arbor 506, and the length thereof permits a wide adjustment of the position of the tool holder on the shaft.

The exterior clamping member 516 is provided with two inwardly directed clamping elements and the interior clamp member 514 is provided with two U-shaped clamping elements 525 positioned so as to receive the inwardly directed clamping element of the exterior clamp member 516.

When the abrasive belt 524 is placed on the arbor 506, the belt hooks 522 on each end of the belt 524 are inserted longitudinally between the clamp elements of clamping members 514 and 516, after the screws 512 have been loosened. The screws 512 are then tightened to stretch the abrasive belt 524 over the arbor 506 and at the same time increase the pressure between the clamping members 514 and 516 by compressing the springs 520. The abrasive belt 254 is longitudinally positioned on the arbor 506 by indexing the edge of the belt 524 against the outer part of the surface of the base portion 504, which extends outward beyond the arbor 506.

It will be appreciated that various modifications and changes may be made in any of the embodiments herein described within the scope of my invention which can be made to be limited only by the appended claims.

I claim:

1. A brake lining grinder and groover comprising a shaft, a U-shaped spacer element frictionally coupled to said shaft, said spacer element being adjustable in position longitudinally of said shaft, a cylindrical arbor having a slot therein adapted to engage a projection extending from spacer element, and a tool bit holder having a laterally extending surface, said spacer element having a bore receiving said tool bit holder, said tool bit holder being urged out of said bore by a spring and being held in said bore by a set screw cooperating with said laterally extending surface, said arbor having one aperture aligned with said tool bit holder and another aperture aligned with said set screw, both of said apertures being elongated in a direction parallel to said shaft and said one aperture being wider than said tool bit holder.

2. A brake lining grinder and groover comprising a shaft having a widened portion, a circular spacer element having a bore receiving said shaft and being frictionally coupled to said shaft adjacent its widened portion, a cylindrical arbor having a slot therein adapted to engage a projection extending from said spacer element, and a tool bit holder having a laterally extending surface, said spacer element having a bore receiving said tool bit holder, said tool bit holder being urged out of said bore by a spring and being held in said bore by a set screw cooperating with said laterally extending surface, said arbor having one aperture aligned with said tool bit holder and another aperture aligned with said set screw, said one aperture being wider than said tool bit holder.

3. A brake lining grinder and groover comprising a shaft having a flattened portion extending along a portion of its length, a circular tool bit holder element having a bore receiving said shaft, said tool bit holder element having a first bore, a locking dog in said first bore having a cone point and adapted to seat against said flattened portion of said shaft, said tool bit holder having a second bore parallel to said shaft and intersecting said first bore, a set screw in said second bore, said set screw having a cone point and cooperating with the cone point of said locking dog, a cylindrical arbor having a slot therein adapted to engage a projection extending from said spacer element, and a tool bit holder having a laterally extending surface, said spacer element having a third bore receiving said tool bit holder, said tool bit holder being held in said bore by a second set screw cooperating with said laterally extending surface, said second set screw disposed in a fourth bore in said spacer element, said fourth bore being parallel to said second bore, said arbor having an aperture therein aligned with said tool bit holder and being elongated in a direction parallel to said shaft.

4. A brake lining grinder and groover comprising a shaft having a transverse bore therein, a tool bit holder disposed within said bore holding a different size tool bit at each end thereof, said tool bit holder having a flattened portion extending along part of its length and terminating in two laterally extending surfaces, said shaft having another bore therein intersecting said transverse bore, a set screw in said bore which cooperates with said surfaces to retain said tool bit holder in either of two grooving positions in said transverse bore and cooperates with said flattened portion to retain said tool bit holder in a nongrooving position in said transverse bore, and an arbor surrounding said shaft and tool bit holder and having three apertures aligned with each end of said tool bit and with said set screw.

5. A brake lining grinder and groover comprising a spindle, an arbor fixed to said spindle, an abrasive member having a cylindrical grinding surface surrounding said arbor, a clamp member for clamping said abrasive member in fixed position relative to said arbor, said arbor and said surface having aligned apertures, a grooving tool extending through said apertures and a tool holder carrying said tool and secured to said spindle for adjustment longitudinally therealong.

6. A brake lining grinder and groover comprising a spindle, an arbor fixed to said spindle, a sheet-like abrasive member wrapped about said arbor, a clamp member fixed to said spindle, said clamp member gripping at least one edge of said abrasive member for clamping said abrasive member in fixed position relative to said arbor, said arbor, abrasive member, and clamp member each having aligned apertures, a grooving tool extending through said apertures and a tool holder carrying said tool and secured to said spindle for longitudinal adjustment therealong, said tool holder holding a tool extending through said apertures.

7. A brake lining grinder and groover comprising a spindle, arbor means supported on said spindle and having a cylindrical external abrasive surface at least a portion of which extends continuously from edge to edge of said surface in a direction parallel to the axis of said arbor means and at least a portion extends cylindrically continuously, said surface having an elongate aperture therein, a grooving tool bit having a cutting edge, and means supporting said tool bit on said spindle for adjusting movement longitudinally therealong relatively to said arbor means and projecting through said aperture with said edge positioned outwardly of the periphery of said abrasive surface.

8. A brake lining grinder and groover comprising arbor means having a cylindrical external abrasive surface at least a portion of which extends continuously from edge to edge of said surface in a direction parallel to the axis of said arbor means, said surface having a pair of apertures therein, a grooving tool shorter than the diameter of said surface and having a cutting edge at each end of different lengths respectively, and means supporting said tool relatively to said arbor means for movement between a first position in which said tool projects through one of said apertures with a first one of said edges located outwardly beyond said surface and the second edge located within the periphery of said surface and a second position in which said tool projects through the other of said apertures with the second edge located outwardly beyond said surface and the first edge located within the periphery of said surface.

9. A brake lining grinder and groover comprising a spindle, a hollow cylindrical arbor having a longitudinally extending slot therein in its periphery, a member extending substantially around said arbor externally thereof and secured thereto and having an external abrasive surface, a tool holder secured to and adjustable longitudinally on said spindle and a grooving tool having a cutting edge and carried by said tool holder and projecting through said slot and with said cuting edge located outwardly beyond the periphery of said abrasive surface.

10. A brake lining grinder and groover according to claim 9, wherein said tool is adjustable on said holder between said projecting position and a position wherein said cutting edge is located entirely within the periphery of said abrasive surface.

11. A brake lining grinder and groover comprising a spindle, a cylindrical arbor carried on said spindle and having a slot extending parallel to its axis, a sheet-like member wrapped around said arbor and having an external abrasive surface with edge portions of said sheet-like member extending through said slot and into said arbor, means engageable with the edges of said sheet-like member within said arbor for maintaining said sheet-like member in position on said arbor and including a first clamp member carried by said spindle and disposed in said arbor, a second clamp member carried by said spindle and disposed in said arbor outwardly of said first clamp member, said clamp members having apertures aligned generally with said slot, a grooving tool bit having a cutting edge, and means supporting said tool bit on said spindle and projecting through said apertures and said slot with said cutting edge outwardly of the periphery of said abrasive surface.

12. A brake lining grinder and groover comprising a spindle, a cylindrical arbor carried on said spindle and having a slot extending parallel to its axis, a sheet-like member wrapped around said arbor and having an external abrasive surface with edge portions of said sheet-like member extending through said slot and into said arbor, a pair of elongate hooks extending along and attached to the edges respectively of said sheet-like member, retaining means carried by said spindle and disposed in said arbor for maintaining said sheet-like member in position on said arbor and having two pairs of opposed flanges receiving and retaining said hooks therebetween, said retaining means having an aperture aligned generally with said slot, a grooving tool bit having a cutting edge, and means supporting said tool bit on said spindle and projecting through said aperture and said slot with said cutting edge outwardly of the periphery of said abrasive surface.

13. A brake lining grinder and groover comprising a spindle, a cylindrical arbor carried on said spindle and having a slot extending parallel to its axis, a sheet-like member wrapped around said arbor and having an external abrasive surface with edge portions of said sheet-like member extending through said slot and into said arbor, a pair of elongate hooks extending along the edges respectively of said sheet-like member and each including a body attached to the edge of said sheet-like member and a flange upstanding from said body, retaining means carried by said spindle and disposed in said arbor for maintaining said sheet-like member in position on said arbor and having two pairs of opposed flanges receiving and retaining the flanges of said hooks therebetween, said retaining means having an aperture aligned generally with said slot, a grooving tool bit having a cutting edge, and means supporting said tool bit on said spindle and projecting through said aperture and said slot with said cutting edge outwardly of the periphery of said abrasive surface.

14. A brake lining grinder and groover comprising arbor means having a cylindrical external abrasive surface at least a portion of which extends continuously from edge to edge of said surface in a direction parallel to the axis of said arbor means, said surface having an aperture therein, a grooving tool bit having a cutting edge, and means supporting said tool bit relatively to said arbor means at a point intermediate the edges of said surface and projecting through said aperture with said edge position outwardly of the periphery of said abrasive surface and wherein is provided a spindle carrying said arbor and wherein said supporting means includes a U-shaped member engirdling and slidable longitudinally along said spindle.

References Cited in the file of this patent
UNITED STATES PATENTS

| | | |
|---|---|---|
| 1,064,885 | Cardinell | June 17, 1913 |
| 1,694,389 | McArdle | Dec. 11, 1928 |
| 2,280,379 | Cramer | Apr. 21, 1942 |
| 2,812,625 | Scala | Nov. 12, 1957 |
| 2,991,593 | Cohen | July 11, 1961 |